…

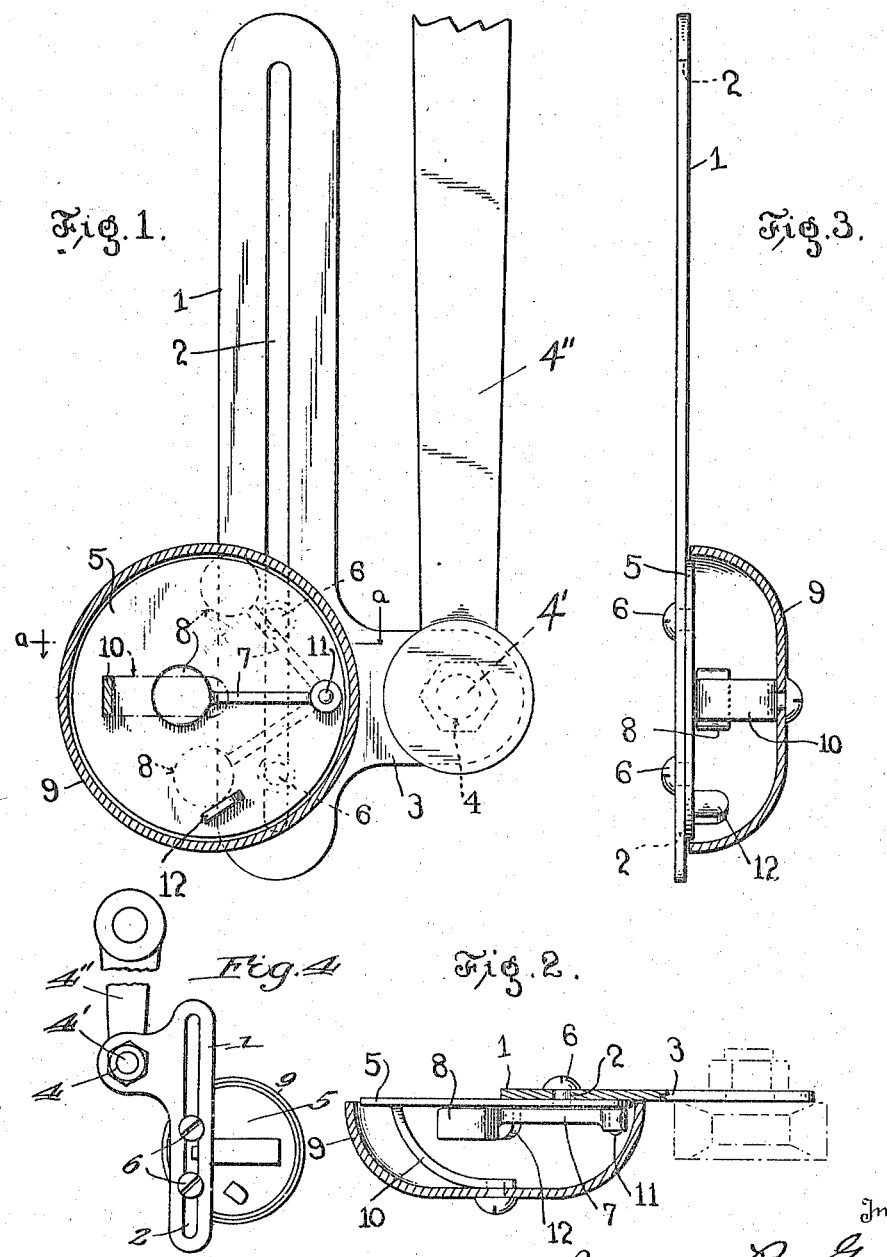

UNITED STATES PATENT OFFICE.

JAMES B. GRAY, OF SIDNEY, OHIO.

SPEED-INDICATOR.

1,286,293.	Specification of Letters Patent.	Patented Dec. 3, 1918.

Application filed October 19, 1914. Serial No. 867,530.

*To all whom it may concern:*

Be it known that I, JAMES B. GRAY, a citizen of the United States, residing at Sidney, in the county of Shelby and State of Ohio, have invented certain new and useful Improvements in Speed-Indicators, of which the following is a specification.

This invention relates to improvements in speed indicators for rotary shaft elements. The object of the invention is to indicate the speed at which the shaft is rotating, and to automatically sound an alarm to indicate that the speed of such revolving part has not reached the speed desired, and to become silent when the desired speed has been reached or exceeded, thus giving the operator an opportunity to increase the speed or take such other action as the exigencies of the case may require.

The device about to be described is intended primarily for use on cream separators, where it may be attached to the crank handle, crank shaft, or it may be used in connection with other machinery.

The object of the invention is to provide an extremely simple device of the character mentioned, easy of attachment to the rotating element, reliable in operation, and not likely to get out of order.

A further object of the invention is to provide, in such a device, a simple means for predetermining the point at which the alarm will cease to be sounded, that is to say, with regard to the speed of the rotating parts.

Referring to the drawings—

Figure 1 is a side elevation of the device, the bell body being removed to show the interior construction, and the device shown attached to the crank arm of a cream separator or the like;

Fig. 2 is a section taken on line *a—a* of Fig. 1, showing the bell body or gong in its proper relative position to the rest of the parts;

Fig. 3 is a central vertical section of the indicator;

Fig. 4 is an elevation of the device secured to a crank showing the bracket swung to a position opposite that shown in Fig. 1.

Referring to the drawings, the numeral 1 designates a plate having therein an elongated slot 2 extending for substantially the full length thereof. This plate is provided with an offset portion 3 provided with an aperture 4, for the reception of the standard 4′ of a crank handle 4″, the speed of whose shaft is desired to be indicated.

The numeral 5 designates a base plate detachably secured to the plate 1 by means of two set screws 6, which extend through the slot 2 and into said plate in such a manner that said plate and parts carried thereby may be moved in said slot to vary the distance from the axis of rotation, to establish the point at which the alarm may be sounded or become silenced.

The numeral 7 designates a bell-clapper provided with the head 8 for contact with the bell body 9, which is supported on the plate 5 by curved arm 10. The opposite end of the bell-clapper is pivoted to a short stud 11, on the base plate, and is prevented from striking but one side of the bell body 9 by a lug 12 secured to the plate 5, with which the head 8 comes in contact during one part of the revolution of the device.

In operation, the device being connected with the shaft or rotating part so that it will rotate in a plane at right angles to said shaft or part, the whole device will be rotated each time it, the shaft, is rotated, the head 8 of the bell-clapper or pendulum 7 will come in contact with the bell body 9 once with every revolution of the device, striking the bell at the top of the circle of revolution and striking the lug at opposite points in the revolution, but consequently making no sound at such opposite point. This striking of the bell with each revolution of the device, indicates that the rotating element is rotating at a comparatively low speed or in fact, enough to cause the alarm. When, however, the speed of revolution increases, the centrifugal force generated in the pendulum or bell-clapper, counterbalancing the weight of the bell clapper, the bell will cease to ring, obviously by reason of the fact that the bell-clapper will cease to fall inwardly at the top of the circle of revolution. By adjusting the bell, and parts carried thereby, with relation to the axis of rotation for any given speed, the bell will cease to ring when said speed is attained.

It will be noted that the bracket 1 is pivotally and adjustably secured to the end of the crank 4″. This permits the bracket to be swung relative to the crank 4′, to any position between that shown in Fig. 1 and a position diametrically opposite, and when so swung it is obvious that what is now the upper end of the slot 2 in the bracket, becomes the outer end or end farthest from the center of revolution of the revolving element, and as the sounding device may be adjusted to occupy any desired position within the slot 2, it follows that a greater range of movement is provided for than would be the case if it were possible only to adjust the sounding device within the slot when the bracket is in the position shown in Fig. 1. This arrangement obviates the necessity of adjusting the bell within the slot to obtain increased or diminished vibrations, as this is accomplished by merely adjusting the slotted arm relative to the crank.

This is particularly advantageous in application to slow moving rotating machine parts and particularly applicable to cream separators where it is desired and required that a certain speed be attained, below which the work is not efficiently done.

Having thus described my invention, what I claim is:—

1. The combination with a rotary element, a bracket movably connected thereto and arranged for arcuate adjustments about its point of connection to the rotary element, and a sounding device carried by the bracket and adjustable relative thereto, and arranged to have its vibrations varied by shifting the positions of the bracket relative to its point of connection with the rotary element.

2. In a device of the character described, the combination with a rotating element, a plate carried thereby and provided with an elongated slot, a sounding device adjustably held in said slot and having therein a pivoted pendulum adapted to contact with the sounding device upon each revolution of the rotating element, until, by the increased speed of the rotating element, the centrifugal force exerted upon the bell-clapper, will hold it out of contact with the sounding device, to cause the sounding to cease, means for limiting the movement of the pendulum in one direction, and means for adjustably holding the sounding device in said slot.

3. In a device of the character described, the combination with a rotary element, of a slotted arm movably connected thereto and arranged for arcuate adjustments about its point of connection to the rotary element, a sounding device held adjustably mounted in the slot in said arm, and means for holding the same in adjusted position therein, and a bell clapper pivoted within the sounding device and adapted to contact therewith upon each revolution of the rotating element until, by increased speed of the rotating element, the centrifugal force exerted upon the bell clapper will hold it out of contact with the sounding device and cause the sounding to cease.

4. In a device of the character described, the combination with a rotating element, a bracket movably connected thereto and arranged for arcuate adjustments about its point of connection to the rotating element, a sounding device held adjustably on the bracket, and means for holding the same in adjusted position thereon, and a bell clapper pivoted within the sounding device, eccentric to its center and adapted to contact with said sounding device upon each revolution of the rotating element, until by increased speed of the rotating element, the centrifugal force exerted upon the bell clapper will hold it out of contact with the sounding device to cause the sounding to cease.

5. The combination with a rotary element, of a bracket carrying a sounding device adjustable in said bracket and having pivotal connection with the rotary element, and adjustable about said pivot whereby the vibrations of the sounding device may be increased or diminished by the arcuate adjustment of the bracket relative to the pivot of the bracket.

6. The combination with a rotary element, a bracket movably connected therewith, and arranged for arcuate adjustments about its point of connection to the rotary element, and a sounding device adjustably combined with the bracket and arranged to have its vibrations varied either by shifting its position relative to the bracket, or by swinging the bracket to or away from the rotary element.

In testimony whereof I affix my signature in presence of two witnesses.

JAMES B. GRAY.

Witnesses:
C. R. Hess,
J. W. Koogler.